(12) United States Patent
Sharma et al.

(10) Patent No.: US 10,585,611 B2
(45) Date of Patent: Mar. 10, 2020

(54) INLINE DEDUPLICATION

(71) Applicant: NetApp Inc., Sunnyvale, CA (US)

(72) Inventors: Mukul Sharma, Bangalore (IN); Kartik Rathnakar, Karnataka (IN); Dnyaneshwar Nagorao Pawar, Bangalore (IN); Venkateswarlu Tella, Bangalore (IN); Kiran Nenmeli Srinivasan, Los Gatos, CA (US); Rajesh Khandelwal, Sunnyvale, CA (US); Alok Sharma, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 28 days.

(21) Appl. No.: 15/138,435

(22) Filed: Apr. 26, 2016

(65) Prior Publication Data
US 2017/0308320 A1 Oct. 26, 2017

(51) Int. Cl.
*G06F 3/06* (2006.01)

(52) U.S. Cl.
CPC .......... *G06F 3/0641* (2013.01); *G06F 3/0605* (2013.01); *G06F 3/067* (2013.01); *G06F 3/0608* (2013.01); *G06F 3/0659* (2013.01); *G06F 3/0665* (2013.01); *G06F 3/0679* (2013.01)

(58) Field of Classification Search
CPC .... G06F 3/0641; G06F 3/0605; G06F 3/0608; G06F 3/0659; G06F 3/0679
See application file for complete search history.

(56) References Cited

U.S. PATENT DOCUMENTS

| 8,099,571 B1* | 1/2012 | Driscoll | G06F 11/2066 |
| | | | 707/655 |
| 8,290,972 B1 | 10/2012 | Deshmukh et al. | |
| 9,116,936 B2* | 8/2015 | Chambliss | G06F 17/30303 |
| 2008/0005141 A1* | 1/2008 | Zheng | G06F 3/0608 |
| 2012/0017060 A1* | 1/2012 | Kapanipathi | G06F 3/0608 |
| | | | 711/162 |
| 2015/0039572 A1* | 2/2015 | Raghuwanshi | G06F 11/1004 |
| | | | 707/692 |

(Continued)

OTHER PUBLICATIONS

Srinivasan, K., Bisson, T., Goodson, G. R., & Voruganti, K. (Feb. 2012). iDedup: latency-aware, inline data deduplication for primary storage. In FAST (vol. 12, pp. 1-14).*

(Continued)

*Primary Examiner* — Tracy A Warren
(74) *Attorney, Agent, or Firm* — Cooper Legal Group, LLC (57) ABSTRACT

One or more techniques and/or computing devices are provided for inline deduplication. For example, a checksum hash table and/or a block number hash table may be maintained within memory (e.g., a storage controller may maintain the hash tables in-core). The checksum hash table may be utilized for inline deduplication to identify potential donor blocks that may comprise the same data as an incoming storage operation. Data within an in-core buffer cache is eligible as potential donor blocks so that inline deduplication may be performed using data from the in-core buffer cache, which may mitigate disk access to underlying storage for which the in-core buffer cache is used for caching. The block number hash table may be used for updating or removing entries from the hash tables, such as for blocks that are no longer eligible as potential donor blocks (e.g., deleted blocks, blocks evicted from the in-core buffer cache, etc.).

20 Claims, 8 Drawing Sheets

(56) References Cited

U.S. PATENT DOCUMENTS

2016/0162509 A1* 6/2016 Berrington ........ G06F 17/30159
707/639

OTHER PUBLICATIONS

Constantinescu, C., Glider, J., & Chambliss, D. (Mar. 2011). Mixing Deduplication and Compression on Active Data Sets. In Data Compression Conference (DCC) 2011 (pp. 393-402).*
Rosenblum, M., & Ousterhout, J.K. (Feb. 1992). The Design and Implementation of a Log-Structured File System. In ACM Transactions on Computer Systems (vol. 10. pp. 26-52).*
Meister, D., & Brinkmann, A. (Jun. 2010). Dedupv1: Improving Deduplication Throughput Using Solid State Drives (SSD). In Proceedings of the 26th IEEE Symposium on Massive Storage Systems and Technologies (2011 (pp. 1-6).*
C. Alvarez, "Back to Basics: Deduplication," NetApp Community TechOnTap, 2011, https://community.netapp.com/t5/Tech-OnTap-Articles/Back-to-Basics-Deduplication/ta-p/84888.*
C. Alvarez, "NetApp Deduplication for FAS and V-Series Deployment and Implementation Guide," NetApp Technical Report TR-3505, Version 8, Feb. 2011, 75 pages.*
Code Project, Alder-32 Checksum Calculation, Oct. 2007, available: https://www.codeproject.com/articles/21083/adler-32-checksum-calculation.*
Int. Search Report/Written Opinion cited in PCT Application No. PCT/US2017/029242 dated Aug. 4, 2017, 19 pgs.

* cited by examiner

INLINE DEDUPLICATION

BACKGROUND

Many storage environments may implement functionality to improve storage efficiency. For example, a storage controller may host a storage virtual machine and a plurality of virtual machine backup files that have overlapping operating system data that is stored as redundant data blocks within a storage device. Storing the redundant data may waste significant amounts of storage resources. Accordingly, the storage controller may implement deduplication to reduce the amount of redundant data being stored within the storage device. For example, the storage controller may determine whether a data block is already stored within the storage device. If the data block is already stored within the storage device, then the storage controller may merely store a reference, in place of the data block, that points to a location within the storage device that already comprises the data block.

Deduplication techniques may operate upon data that is already stored within storage devices. Unfortunately, accessing storage devices during deduplication can result in write amplification and unnecessary input/output (I/O) costs. Write amplification has a negative impact on solid state storage (SSD) devices, such as flash storage or a hybrid storage aggregate SSD tier. Accordingly, there is a need to efficiently perform deduplication before write operations are performed upon storage devices and/or with minimal access to storage devices, which may be beneficial for batch replication, virtual machine migration, virtual desktop infrastructure patching, scenarios where the same data is copied multiple times in a short time, etc.

DETAILED DESCRIPTION

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for inline deduplication are provided herein. For example, a checksum hash table and/or a block number hash table are maintained in memory (e.g., in-core memory) for identifying potential donor blocks that can be used for the deduplication of storage operation data (e.g., data that will be written to storage by a write operation). Inline deduplication uses potential donor blocks that are stored within an in-core buffer cache (e.g., recently written data in the in-core buffer cache that has not yet been flushed to a storage device) within which data is cached before being later flushed to disk such as during a consistency point. When inline duplication is done as part of the consistency point, then batch operations to recipient buftree and donor refcounts can be leveraged, which is useful in copy cases where a batch operation can exploit locality of reference of donor metadata and recipient buftree. Since a majority of duplication is done as part of a file system backend, client latency impact in a write path is reduced.

Performing inline deduplication using data within the in-core buffer cache reduces the amount of disk access that can otherwise result in write amplification such as for SSD disks (e.g., no additional I/O, such as read I/O, is performed to disk for byte-to-byte compare purposes, which will mitigate read amplification). The inline deduplication is performed upon newly written data, while a donor set may come from recently written or read blocks in the in-core buffer cache. In an example, the donor set may come from an extended cache, such as a performance accelerator module (PAM) card. Reducing the number of writes to SSD can reduce the maintenance and replacement cost of storage. Potential donor block lookup is efficiently performed because the checksum hash table and the block number hash table are stored in memory. In an example, the hash tables are kept in-core in a persistent manner in order to avoid central processing unit (CPU) and disk resources otherwise used to read an ondisk key value store mapping (or fingerprint database). In an example, the checksum hash table may be implemented as a close hash store so that cache line misses are minimized during lookup. A substantial amount of deduplication workflow may occur asynchronously to a client write path so that client latency is minimally impacted. In an example, similar checksums as a file system can be used for fingerprinting so that checksum computational costs can be amortized. Deduplication can be used for a variety of data storage scenarios, such as virtual desktop infrastructure patching, virtual machine migration, data copying (e.g., workloads where similar data is copied multiple times in a short span of time), etc.

Figure 1:
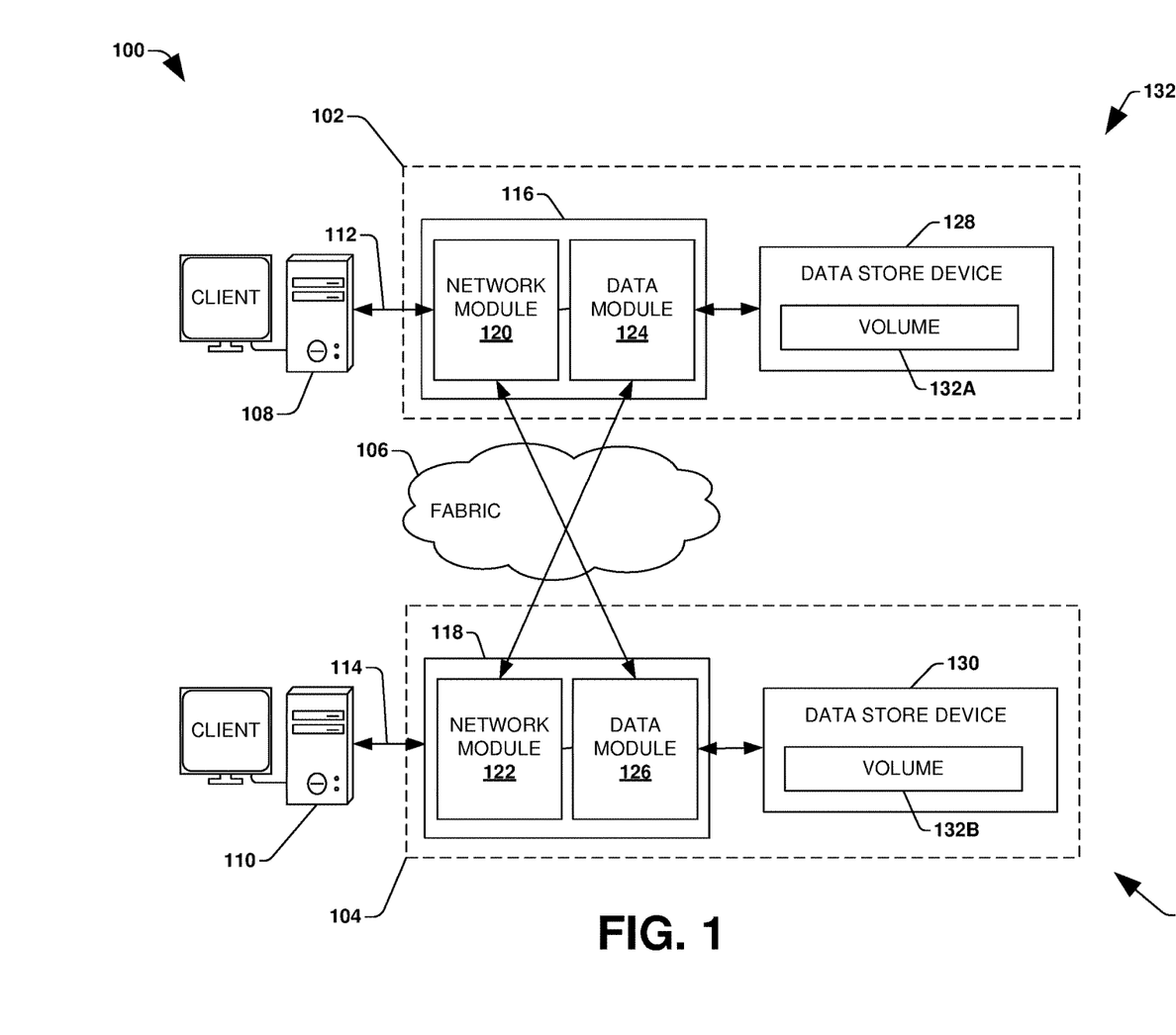
FIG. 1 is a component block diagram illustrating an example clustered network in accordance with one or more of the provisions set forth herein.

To provide context for inline deduplication, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the node 118 within the data storage system 104 (e.g., which may be remote from the data storage system 102). The node 118 can forward the data to the data storage device 130 using the data module 126, thereby accessing volume 132B associated with the data storage device 130.

It may be appreciated that inline deduplication may be implemented within the clustered network environment 100. In an example, the node 116 may store a checksum hash table and/or a block number hash table in memory (e.g., in-core), which may be used for deduplicating data using potential donor blocks stored within an in-core buffer in order to minimize access to the data storage device 128. It may be appreciated that inline deduplication may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
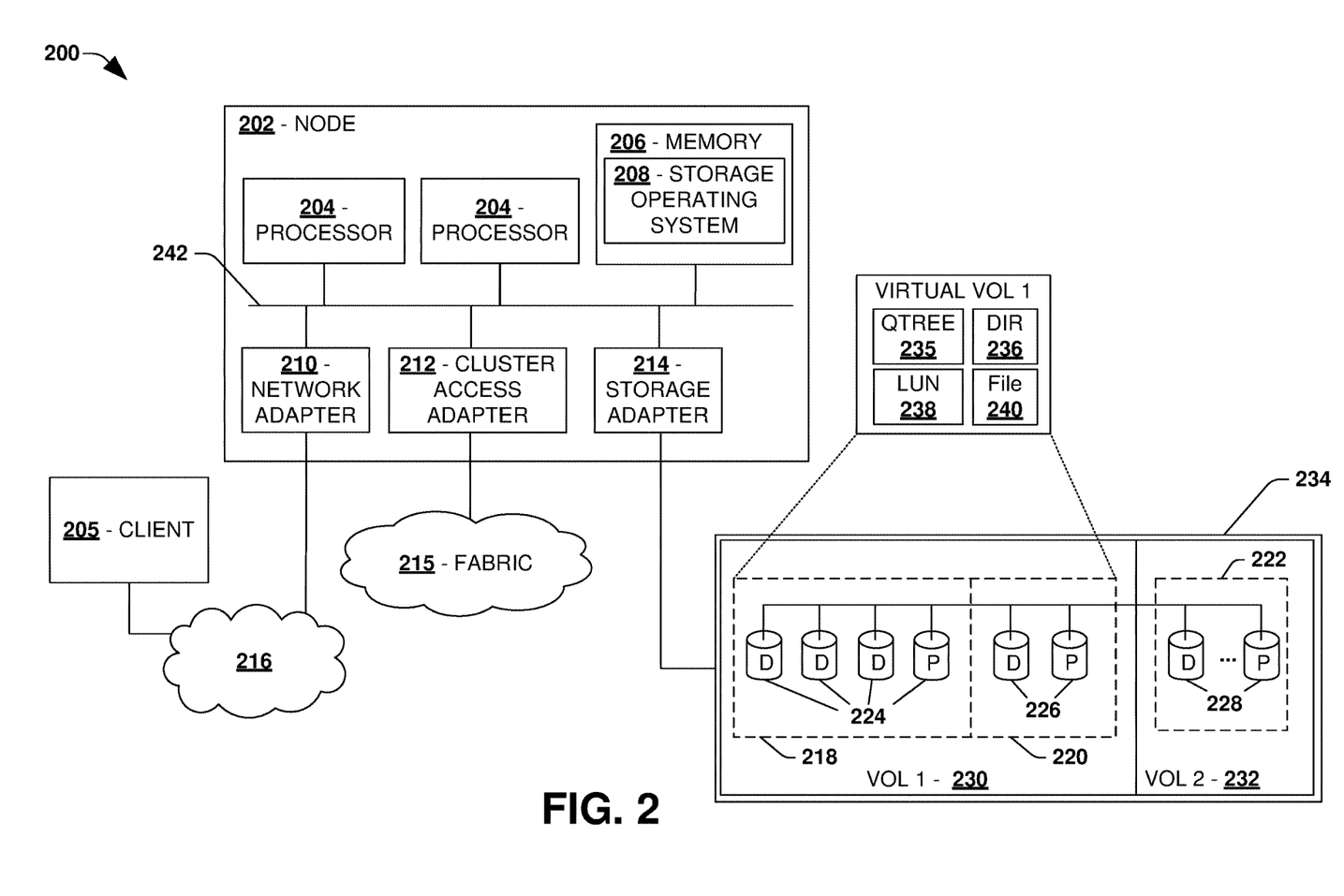
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that inline deduplication may be implemented for the data storage system 200. In an example, the node 202 may store a checksum hash table and/or a block number hash table in memory (e.g., in-core), which may be used for deduplicating data using potential donor blocks stored within an in-core buffer in order to minimize access to the one or more data storage devices 234. It may be appreciated that inline deduplication may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
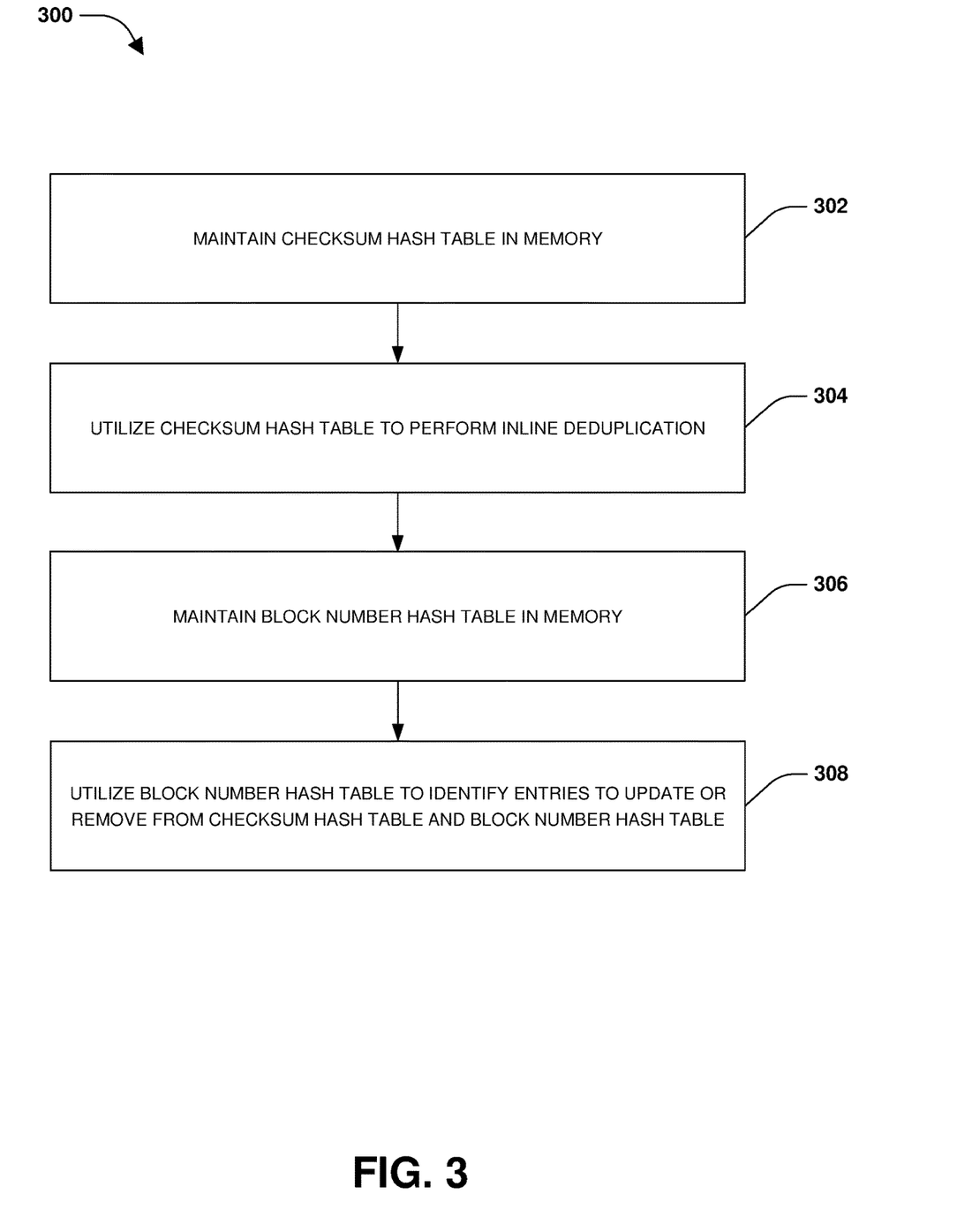
FIG. 3 is a flow chart illustrating an exemplary method of inline deduplication.

One embodiment of inline deduplication is illustrated by an exemplary method 300 of FIG. 3. At 302, a checksum hash table may be maintained in memory (e.g., maintained in-core by a storage controller). The checksum hash table may comprise entries mapping fingerprints (e.g., fingerprints of blocks, such as 4 kb blocks, stored within an in-core buffer cache of the storage controller, such as fingerprints created by an alder32 RAID checksum or any other checksum or fingerprinting technique selected based upon strength of a checksum to reduce hash collisions of false positives, CPU computational load, and/or size of the checksum) to block numbers (e.g., virtual volume block numbers) of blocks within the in-core buffer cache associated with storage (e.g., a storage device, such as a solid state storage (SSD) device, an SSD tier of a hybrid storage aggregate, or any other type of storage media). For example, checksum, used by a RAID layer (e.g., alder32), may be reused to avoid checksum computation by the RAID layer because inline deduplication computed checksums can be reused. Furthermore, read path checksum, computing by the RAID layer, may be directly used by inline deduplication so there is no re-computation for insertion in a hash table. An entry within the checksum hash table may comprise a volume identifier of a volume to which a block of data is to be written from the in-core buffer cache, a virtual volume block number of the block, a physical volume block number of the block, etc. In an example of the hybrid storage aggregate, the checksum hash table may be maintained as a write staged block check hash table and/or a read cached block checksum table.

In an example, a fingerprint primary key may be specified for the checksum hash table (e.g., fingerprints may be primary keys used to query entries within the checksum hash table in order to identify corresponding block numbers of blocks represented by such fingerprints).

At 304, the checksum hash table may be utilized to perform inline deduplication. For example, a write operation (e.g., or any other storage operation), targeting the storage, may be received. A checksum operation (e.g., a fingerprint operation) may be performed upon data of the write operation to determine a fingerprint of the write operation. The checksum hash table may be evaluated to determine whether the fingerprint of the write operation is mapped to a block number (e.g., a virtual volume block number) of a potential donor block (e.g., a data block within the in-core buffer cache that may comprise the same data as the data of the write operation). The potential donor block may comprise compressed data or uncompressed data.

In an example, a reference count value of the block number of the potential donor block may be check to see if the reference count value does not exceed a threshold (e.g., otherwise the potential donor block may be disqualified for deduplication). Responsive to identifying the potential donor block, a determination may be made as to whether the potential donor block resides within the in-core buffer cache. Responsive to the potential donor block residing within the in-core buffer cache, inline deduplication may be performed for the write operation before the write operation is written to the storage. For example, a byte-by-byte comparison may be performed between the data of the write operation and data of the potential donor block. If the byte-by-byte comparison indicates that the data of the write operation and the data of the potential donor block is the same, then the inline deduplication may be performed (e.g., otherwise the inline deduplication may not be performed). In an example of the inline deduplication, a virtual volume block number and/or a physical volume block number of the potential donor block may be copied to a recipient indirect buffer, and a disk write for the write operation may be mimicked. It may be appreciated that any type of deduplication technique may be performed for the data of the write operation. Responsive to completing the inline deduplication, the reference count value for the block number may be incremented. In this way, deduplication may be performed inline using data within the in-core buffer cache while minimizing disk access to the storage because the byte-by-byte comparison is performed using data within the in-core buffer cache. In an example, inline deduplication may be performed for a batch of write operations, such as in response to encountering a consistency point where cached data is to be flushed to the storage from the in-core buffer cache.

In an example where no potential donor block is identified within the checksum hash table, a new entry may be created within the checksum hash table. The new entry may map the fingerprint of the write operation to a new block number of data of the write operation.

At 306, a block number hash table may be maintained within the memory (e.g., in-core). The block number hash table may comprise entries mapping block numbers, of blocks within the in-core buffer cache, to fingerprints. In an example, the checksum hash table may be maintained as a forward table for identifying potential donor blocks, while the block number hash table may be maintained as a reverse table used to identify entries to update or remove within the checksum hash table and/or the block number hash table, at 308. In an example, a virtual volume primary key may be specified for the block number hash table (e.g., virtual volume block numbers may be primary keys used to query entries within the block number hash table in order to identify corresponding fingerprints of data referenced by such virtual volume block numbers).

In an example of using the block number hash table, a delete operation, targeting the storage, may be received. A target block that is to be deleted by the delete operation may become ineligible as a potential donor block for deduplication). Accordingly, the block number hash table may be evaluated to determine whether the block number hash table comprises a target entry mapping a target block number of the delete operation (e.g., a virtual volume block number of data that is to be deleted by the delete operation) to a target fingerprint. Responsive to identifying the target entry, an entry, mapping the target fingerprint to the target block number, may be removed from the checksum hash table and the target entry may be removed from the block number hash table.

In another example of using the block number hash table, a target block may be determined as having been evicted from the in-core buffer cache. The target block may become ineligible as a potential donor block for deduplication. Accordingly, the block number hash table may be evaluated to determine whether the block number hash table comprises a target entry mapping a target block number of the target block to a target fingerprint. Responsive to identifying the target entry, an entry, mapping the target fingerprint to the target block number, may be removed from the checksum hash table and the target entry may be removed from the block number hash table.

In another example of using the block number hash table, an overwrite operation, targeting the storage, may be received. The block number hash table may be evaluated to determine whether the block number hash table comprises a target entry mapping a target block number of the overwrite operation to a target fingerprint. Responsive to identifying the target entry, an entry, mapping the target fingerprint to the target block number, may be updated within the checksum hash table and the target entry may be updated within the block number hash table based upon the overwrite operation.

Figure 4A:
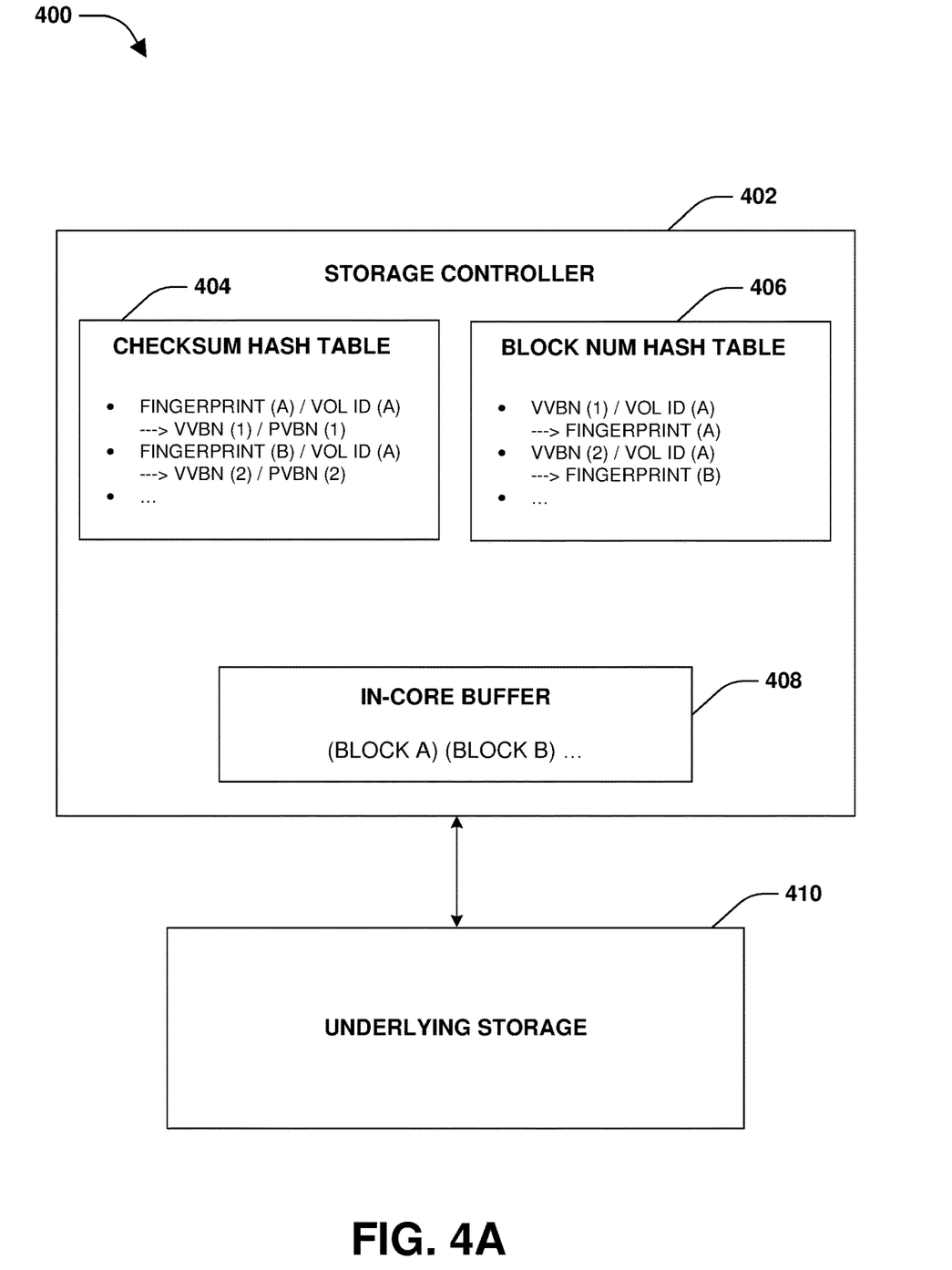
FIG. 4A is a component block diagram illustrating an exemplary computing device for inline deduplication.

FIGS. 4A-4D illustrate examples of a system 400 for inline deduplication. FIG. 4A illustrates a storage controller 402 that stores data, such as client data, within underlying storage 410 (e.g., a hybrid storage aggregate, a solid state storage device, or any other type of storage). The storage controller 402 may comprise an in-core buffer cache 408 within which the storage controller 402 may cache data before writing such data to the underlying storage 410. For example, the storage controller 402 may flush data, such as a data block (A), a data block (B), and/or other data blocks (e.g., data that is newly created or modified by write operations processed by the storage controller 402) to the underlying storage 410 during a consistency point.

A checksum hash table 404 and/or a block number hash table 406 may be maintained within memory of the storage controller 402. The checksum hash table 404 may comprise entries mapping fingerprints (e.g., unique identifiers for data, such as checksums created by an alder32 RAID checksum or any other hash, fingerprint, or checksum creation technique) to block numbers of blocks within the in-core buffer cache 408 (e.g., virtual volume block numbers and/or physical volume block numbers of the block (A), the block (B), etc.). For example, a fingerprint (A) and volume ID (A) may be mapped to a virtual volume block number (1) and a physical volume block number (1) of block (A), a fingerprint (B) and volume ID (A) may be mapped to a virtual volume block number (2) and a physical volume block number (2) of block (B), etc. The block number hash table 406 may comprise entries mapping block numbers of blocks within the in-core buffer cache 408 (e.g., virtual volume block numbers and/or physical volume block numbers of the block (A), the block (B), etc.) to fingerprints.

Figure 4B:
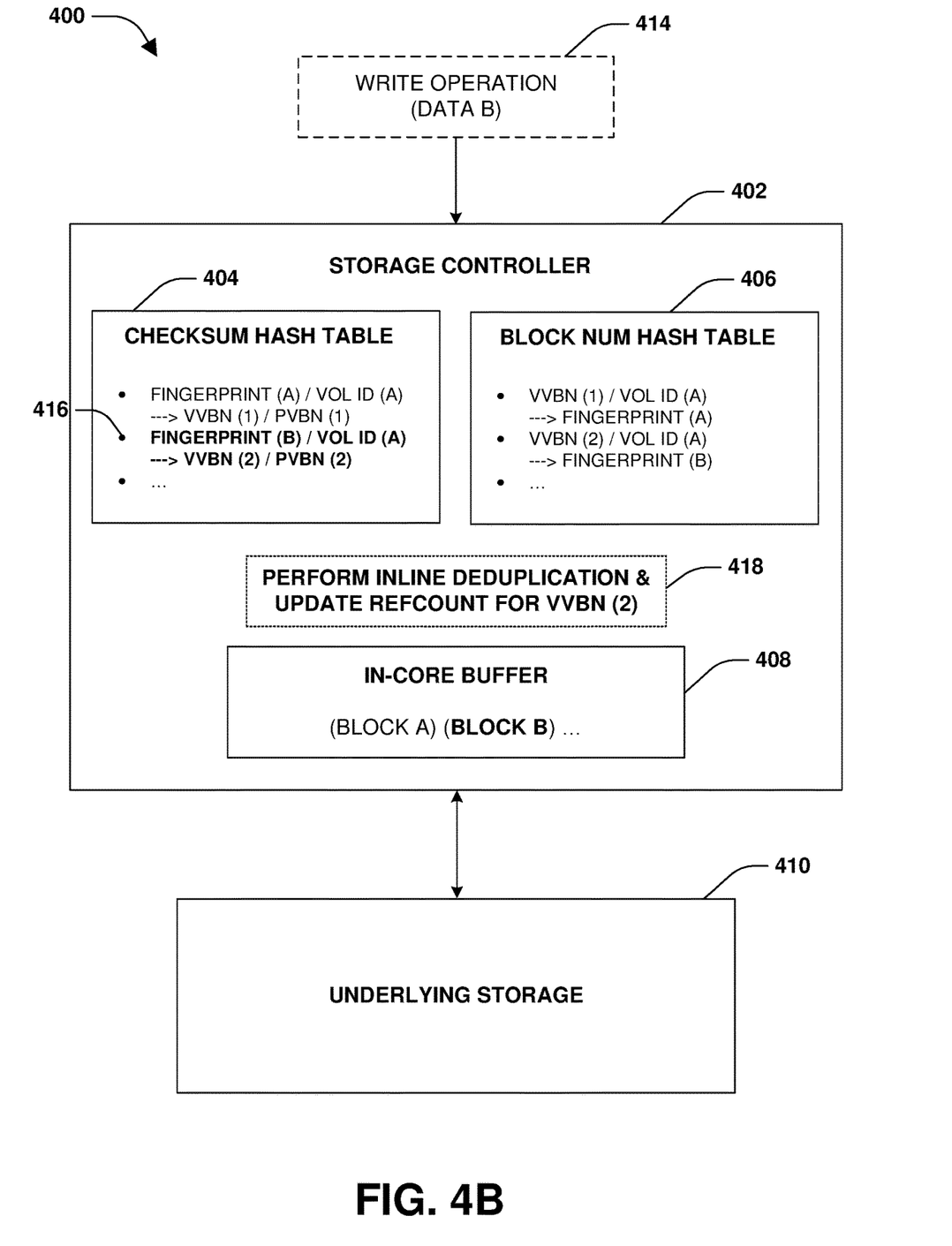
FIG. 4B is a component block diagram illustrating an exemplary computing device for inline deduplication, where data of a write operation is deduplicated.

FIG. 4B illustrates the storage controller 402 receiving a write operation 414 that is to write data (B) to a volume (A) having the volume ID (A). A fingerprint of the data (B) may be generated (e.g., by a hashing algorithm, a fingerprint creation algorithm, a checksum creation algorithm, etc.). For example, the fingerprint (B) may be generated from the data (B). The fingerprint (B) may be used to query the checksum hash table 404 to determine that an entry 416 maps the fingerprint (B) and volume ID (A) to the virtual volume block number (2) and the physical volume block number (2) of the block (B) within the in-core buffer 408. Accordingly, inline deduplication 418 may be performed for the data (B) of the write operation 414 (e.g., a reference/pointer to the block (B) may be used in place of the data (B) for subsequently writing data from the in-core buffer cache 408 to the underlying storage 410, and also in-core block pointers are shared), and a reference count for the virtual volume block number (2) may be updated.

Figure 4C:
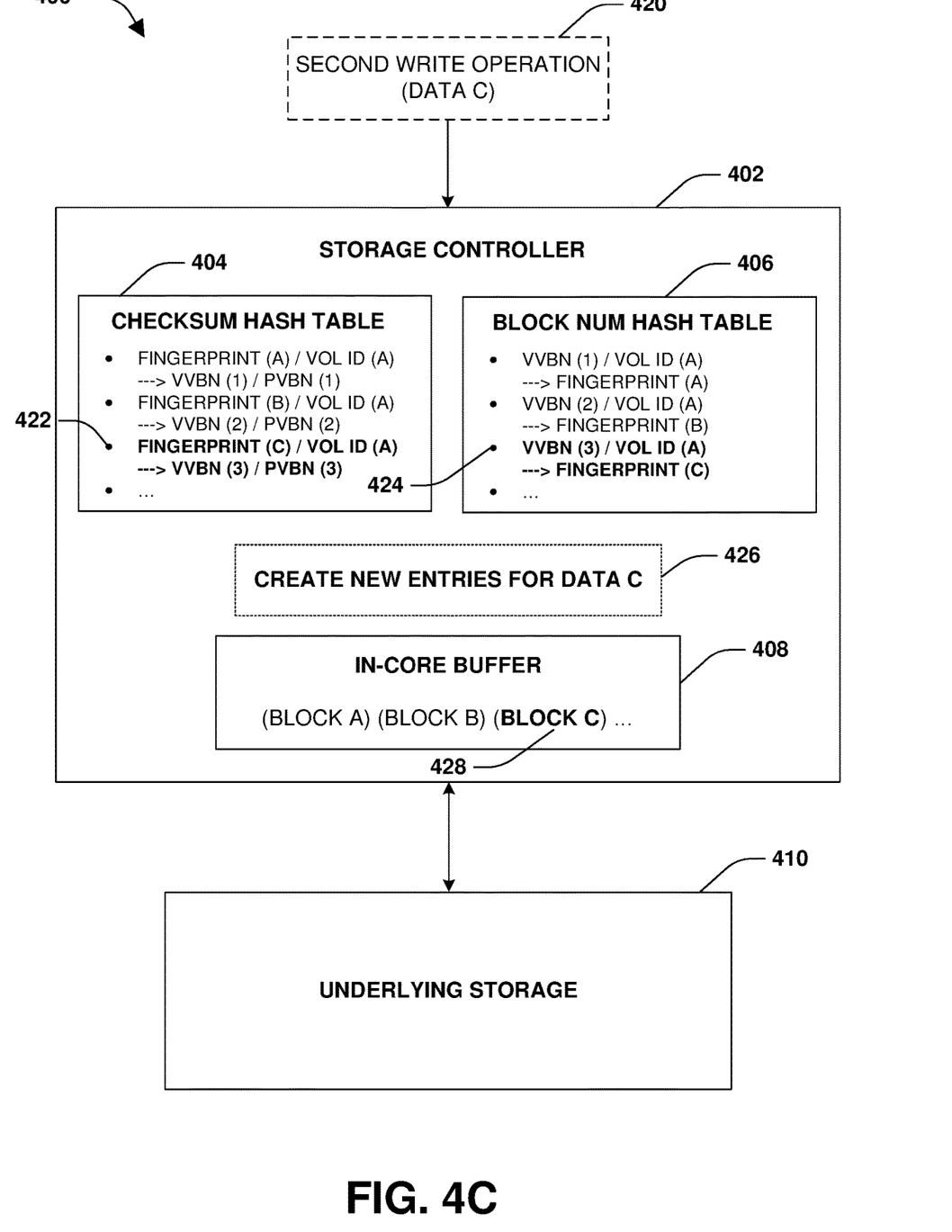
FIG. 4C is a component block diagram illustrating an exemplary computing device for inline deduplication, where entries are created within a checksum hash table and a block number hash table for data of a write operation.

FIG. 4C illustrates the storage controller 402 receiving a second write operation 420 that is to write data (C) to the volume (A) having the volume ID (A). A fingerprint of the data (C) may be generated (e.g., by a hashing algorithm, a fingerprint creation algorithm, a checksum creation algorithm, etc.). For example, the fingerprint (C) may be generated from the data (C). The fingerprint (C) may be used to query the checksum hash table 404 to determine that the checksum hash table 404 does not comprise any entries that map the fingerprint (C) and volume ID (A) to a block number of a potential donor block within the in-core buffer cache 408 (e.g., the data (C) does not exist within the in-core buffer 408). Accordingly, the data (C) may be written into the in-core buffer cache 408 to create a block (C) 428. A new entry 422, mapping the fingerprint (C) and volume ID (A) to a virtual volume block number (3) and a physical volume block number (3) of the block (C) 428, may be created within the checksum hash table 404. A new entry 424, mapping the virtual volume block number (3) and volume ID (A) to the fingerprint (C), may be created within the block number hash table 406. In this way, new entries are created 426 for data (C) (e.g., block (C) 428) within the checksum hash table 404 and/or the block number hash table 406 for subsequent inline deduplication.

Figure 4D:
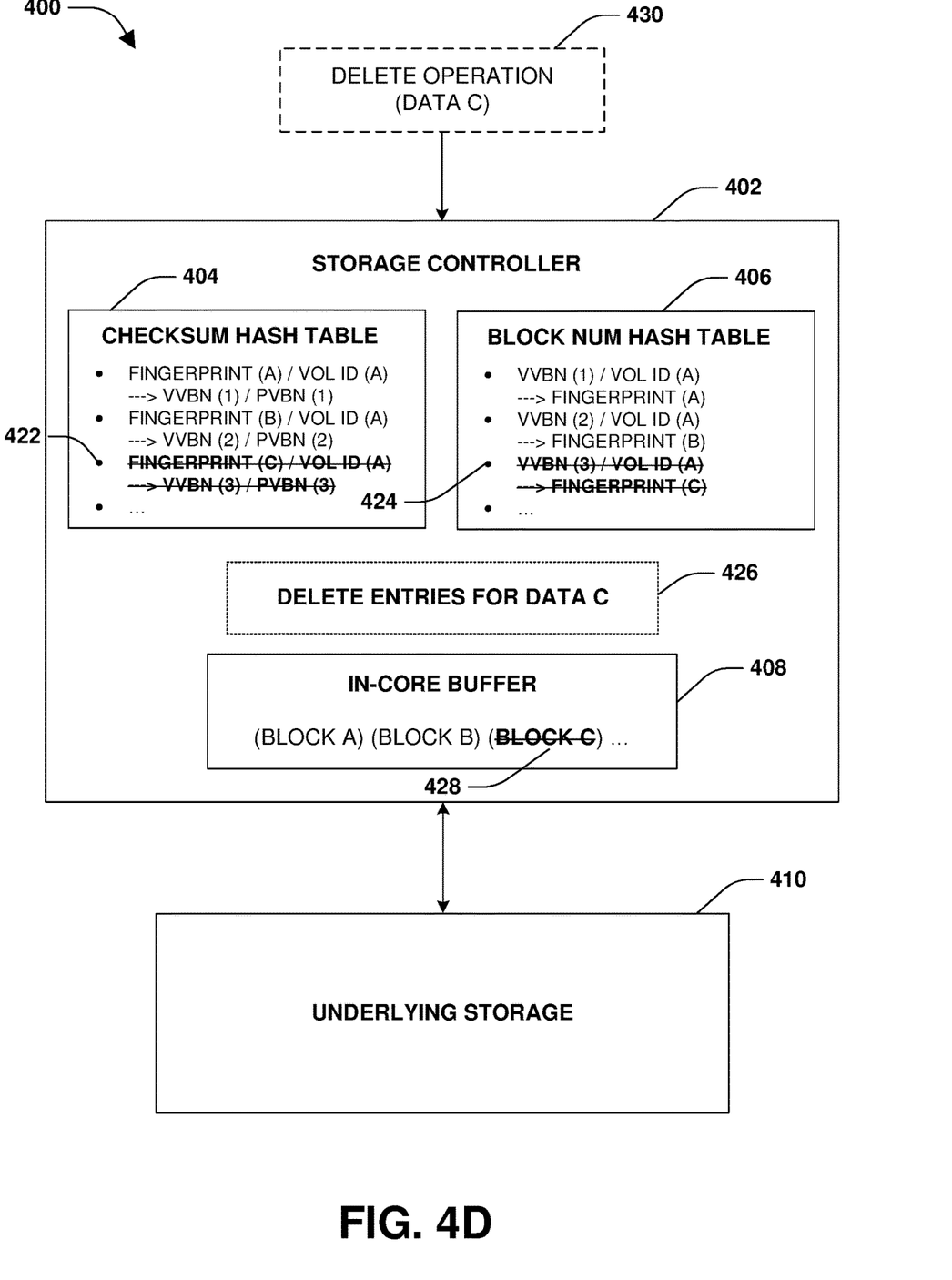
FIG. 4D is a component block diagram illustrating an exemplary computing device for inline deduplication, where entries are removed from a checksum hash table and a block number hash table for data targeted by a delete operation.

FIG. 4D illustrates the storage controller 402 receiving a delete operation 430 for deleting data (C) corresponding to block (C) 428 associated with virtual volume block number (3). The virtual volume block number (3) and/or the volume ID (A) may be used to query the block number hash table 406 to determine that the virtual volume block number (3) and the volume ID (A) are mapped to the fingerprint (C) by the new entry 424. Accordingly, the new entry 422 may be deleted from the checksum hash table 404, the new entry 424 may be deleted from the block number hash table 406, and/or the block (C) 428 may be deleted from the in-core buffer cache 408.

Figure 5:
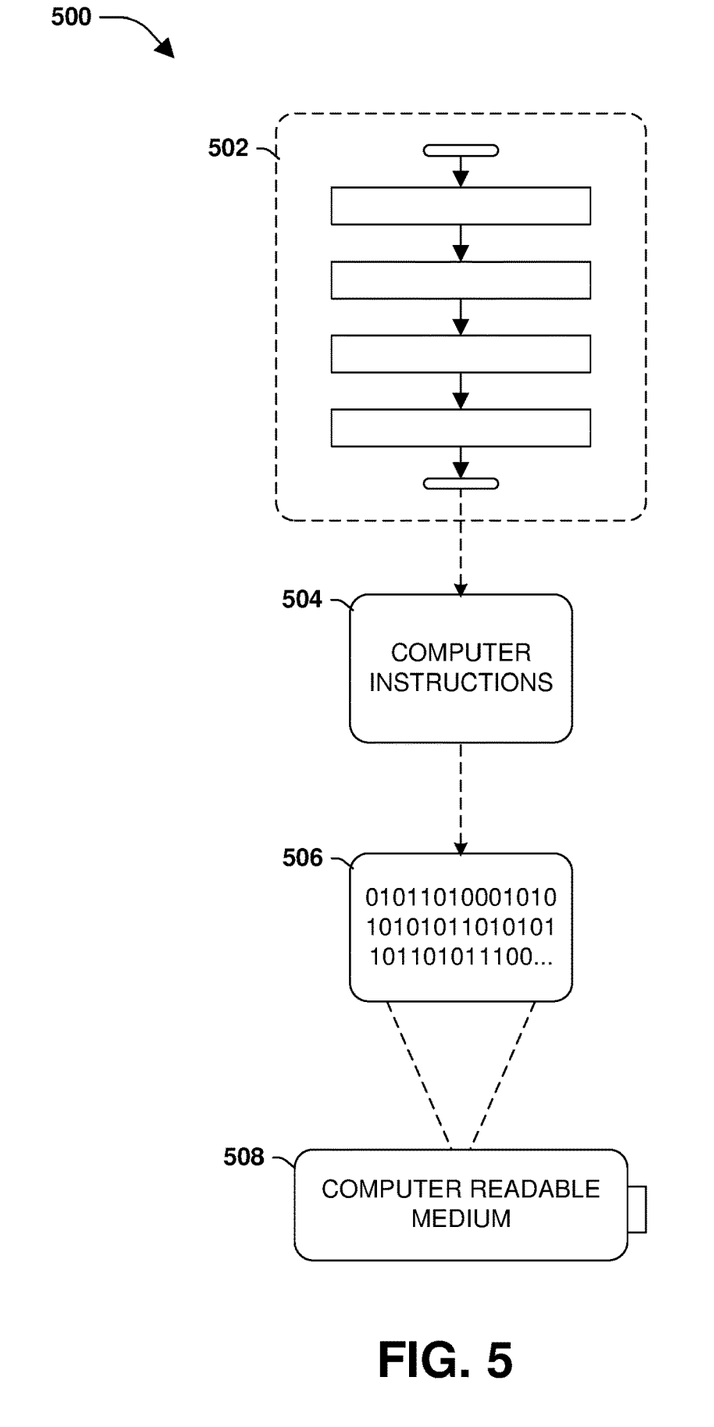
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4D, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   evaluating, by a node that uses a storage adapter to access a RAID layer for managing storage of a RAID array targeted by a write operation, a checksum hash structure, maintained within memory, to determine that a fingerprint of the write operation is mapped to a block number of a cached block cached within a cache before being flushed to the storage, wherein the checksum hash structure is populated with fingerprints corresponding to RAID checksums previously computed by the RAID layer during inline deduplication;
   performing inline deduplication for the write operation with respect to the cached block within the cache, wherein the performing comprises reusing read path checksums computed by the RAID layer as fingerprints used by the inline deduplication;
   evaluating a block number hash structure using the block number of the cached block to identify the fingerprint as being mapped to the block number based upon a delete operation targeting the block number, wherein the block number hash structure comprises entries indexed by block numbers of cached blocks and wherein the entries map the block numbers to fingerprints; and
   removing entries within the checksum hash structure and the block number hash structure corresponding to the cached block.

2. The method of claim 1, comprising:
   creating a new entry within the checksum hash structure.

3. The method of claim 1, wherein the RAID checksums comprise alder32 RAID checksums.

4. The method of claim 1, wherein the inline deduplication skips deduplicating the write operation based upon a reference count value exceeding a threshold.

5. The method of claim 1, comprising:
   evaluating the checksum hash structure to determine that a second fingerprint of a second write operation is mapped to a second block number of a second cached block cached within the cache.

6. The method of claim 5, comprising:
   creating a new entry within the checksum hash structure based upon a determination that the cache lacks the second cached block, the new entry mapping the second fingerprint of the second write operation to a new block number of data of the second write operation.

7. The method of claim 1, comprising:
   removing an entry, mapping a target fingerprint to a target block number of a target block evicted from the cache, from the checksum hash structure.

8. The method of claim 1, wherein an entry of the checksum hash structure comprises a volume identifier, a virtual volume block number, and a physical volume block number associated with the cached block within the cache.

9. The method of claim 1, wherein the evaluating a block number hash structure comprises:
querying the block number hash structure using the block number as an index into the block number hash structure to identify an entry within the block number hash structure that maps the block number to the fingerprint.

10. The method of claim 1, wherein the removing comprises:
removing an entry, mapping the fingerprint to the block number, from the checksum hash structure.

11. The method of claim 1, wherein the removing comprises:
removing an entry from the checksum hash structure.

12. The method of claim 1, comprising:
updating an entry, mapping a target fingerprint to a target block number of an overwrite operation, within the checksum hash structure.

13. The method of claim 1, comprising:
performing inline deduplication for a batch of write operations based upon encountering a consistency point where cached data is flushed to the storage.

14. The method of claim 1, wherein the storage corresponds to a hybrid storage aggregate comprising a solid state storage tier.

15. The method of claim 14, comprising:
maintaining a write staged block checksum hash structure and a read cached block checksum structure for performing inline deduplication for the hybrid storage aggregate.

16. The method of claim 1, comprising:
specifying a fingerprint primary key as an index for the checksum hash structure.

17. The method of claim 1, comprising:
specifying a virtual volume block number primary key as an index for the block number hash structure.

18. The method of claim 12, comprising:
updating a target entry within the block number hash structure based upon the target entry mapping the target block number to the target fingerprint.

19. A non-transitory machine readable medium having stored thereon instructions which when executed by a machine, causes the machine to:
evaluate, by a node that uses a storage adapter to access a RAID layer for managing storage of a RAID array targeted by a write operation, a checksum hash structure, maintained within memory, to determine that a fingerprint of the write operation is mapped to a block number of a cached block cached within a cache before being flushed to the storage, wherein the checksum hash structure is populated with fingerprints corresponding to RAID checksums previously computed by the RAID layer during inline deduplication;
perform inline deduplication for the write operation with respect to the cached block within the cache, wherein read path checksums computed by the RAID layer are reused as fingerprints by the inline deduplication;
evaluate a block number hash structure using the block number of the cached block to identify the fingerprint as being mapped to the block number based upon a delete operation targeting the block number, wherein the block number hash structure comprises entries indexed by block numbers of cached blocks and wherein the entries map the block numbers to fingerprints; and
remove entries within the checksum hash structure and the block number hash structure corresponding to the cached block.

20. A computing device comprising:
a memory comprising machine executable code having stored thereon instructions for performing a method; and
a processor coupled to the memory, the processor configured to execute the machine executable code to cause the processor to:
evaluate, by a node that uses a storage adapter to access a RAID layer for managing storage of a RAID array targeted by a write operation, a checksum hash structure, maintained within memory, to determine that a fingerprint of the write operation is mapped to a block number of a cached block cached within a cache before being flushed to the storage, wherein the checksum hash structure is populated with fingerprints corresponding to RAID checksums previously computed by the RAID layer during inline deduplication;
perform inline deduplication for the write operation with respect to the cached block within the cache, wherein read path checksums computed by the RAID layer are reused as fingerprints by the inline deduplication;
evaluate a block number hash structure using the block number of the cached block to identify the fingerprint as being mapped to the block number based upon a delete operation targeting the block number, wherein the block number hash structure comprises entries indexed by block numbers of cached blocks and wherein the entries map the block numbers to fingerprints; and
remove entries within the checksum hash structure and the block number hash structure corresponding to the cached block.

* * * * *